Patented Jan. 19, 1937

2,067,941

UNITED STATES PATENT OFFICE 2,067,941

WATER RESISTANT MOLDED ARTICLES AND METHOD OF MAKING THEM

Clarence A. Nash, North Caldwell, N. J., assignor to Bakelite Corporation, New York, N. Y., a corporation of Delaware No Drawing. Application March 25, 1933, Serial No. 662,831

11 Claims. (Cl. 18—55)

This application is a continuation in part of my application 345,889 filed March 9, 1929.

This invention relates to moldable compositions comprising an organic or fibrous filler such as wood flour, asbestos, cotton, woven fabric, etc. and a resinoid binder, such as a phenolic resinoid, that is, a synthetic resin obtained in the reaction of a phenol and an agent having an active methylene or substituted methylene group, such as formaldehyde, etc., the resinoid being characterized by an initial fusible and soluble or potentially reactive state and convertible to a final infusible and insoluble state by the application of heat. Moldable compositions of this nature as heretofore supplied have been deficient in that articles molded therefrom when subjected to continued or repeated contact with water, frequently become so distorted that surface cracks appear and the usefulness of the product is ended; the same effect is noticeable to a greater or less extent with regard to contacts with other liquids, oils and similar substances. For this reason such compositions are not adapted for the manufacture of soda fountain spigots, agitators, and similar objects having repeated contact with liquids, especially when they are also submitted to rapid temperature changes.

According to the present invention, moldable resinoid compositions are so modified as to render them commercially satisfactory for the manufacture of articles having repeated or continued contact with liquids. It rests on the discovery that the addition of water or the like to an otherwise normal moldable resinoid composition precludes undue subsequent distortion, such as cracking, swelling or other changes in configuration of the articles molded therefrom when subject to the action of liquids.

A liquid wetting agent, preferably a non-solvent such as water, can be added at any stage during or following the preparation of the molding composition, or it can be mixed with either the resinoid or the filler, or both, prior to simultaneously with or following the admixture of the resinoid bonding agent with the filler. For example, a ball mill is charged with an organic filler such as wood flour and a resinoid, and water is blended into the mixture; or the mixture of filler and resinoid is moistened with water by sprinkling or spraying during the usual working of the composition between heated rolls to secure an intimate distribution of bonding agent and filler. Under suitable conditions the liquid can be applied in vapor form when the temperatures permit.

The amount of liquid added in this manner need not be large and additions of 3 to 5 per cent and even less by weight yield molded articles that show remarkable and unexpected freedom from distortion in the presence of liquids. The additions should not be in such amounts as to alter the powdered condition or the molding properties of the molding composition, and for these reasons about 5 per cent by weight of the composition has been found to be about the upper practical limit of addition to a normal molding composition. A molding composition normally contains some moisture and the limit here set is based on that fact; manifestly if the composition be previously submitted to a drying or equivalent operation to reduce the normal moisture content, more water can then be added. The term "powdered" is here used in the sense accepted in the industry, namely, a composition ground in a state of subdivision sufficiently fine for hot molding.

In the practice of the invention a potentially reactive, i. e., heat-hardenable, resinoid is prepared in the usual manner from a phenol, such as commercial phenol or cresol, and formaldehyde (or other aldehydic or equivalent agent having an active methylene or substituted methylene group) in proportions to yield the potentially reactive product. The reaction is usually continued until there results when cold a solid grindable product. In the customary practice the ground resinoid is mixed with a filler as wood flour in a blender or other device and the mixture is then subjected to the action of hot rolls whereby the resinoid and filler are thoroughly blended; the sheets so formed are ground to the desired fineness and the powdered product is packed and sealed in containers to be sold as a molding composition. In order to modify the composition in accordance with this invention it is only necessary that at some stage moisture is included. While this can take place during the blending of the ingredients or during the subsequent hot rolling operation either by sprinkling, spraying or steaming the mixture being blended or rolled, there is evidently considerable moisture lost in the hot rolling operation. It is therefore preferable to charge a ball mill, blender, kneader or other suitable device with the molding composition after it has been formed on the hot rolls and ground, and to add the desired amount of water or water vapor to the mass as it is being stirred; this affords a better control of the water content of the molding composition preparatory to its molding. The powder is then packed in sealed containers.

As stated, the amount of water added is not sufficient to change the powdery character of the molding composition or to interfere with the usual hot-molding procedure to which such a powder is subjected. But after the water is added better results are obtained if the composition is allowed to age for at least 24 hours before molding. In the sealed containers there is no chance for water to escape and the composition therefore keeps indefinitely. The commercial molder to whom the powder is sent does not open a container until he is ready to proceed with molding, and consequently there is little or no opportunity afforded in this interval of time for a change in the moisture content due to exposure. In molding the powder is charged into a closed or flash mold and there subjected to the customary temperatures of about 300 to 375° F. and pressures of about 1500 to 3000 pounds or more per square inch depending on the type of molding composition. The added moisture content as here disclosed does not noticeably interfere with these molding conditions; but it does, however, have a beneficial effect (other than those exhibited in the molded piece) of imparting added flow so that the composition fills the molds more quickly and there is a lessening of any tendency of resin separation.

In determining comparative molding properties of compositions and the characteristics of articles made from them, the universal practice followed is that of molding cups. These are made by charging a hollow chase of proper dimensions and inserting a plunger whereby the charge is caused to flow up the sides about the plunger. For satisfactory molding a cup must be completely filled out and there must not be any resin separation or surface defects such as blisters. A number of such comparative cup tests were made with different molding compositions in order to demonstrate the advantages residing in the present invention.

In general the tests followed were those of molding cups, filling the cups with water and then placing the cups in an oven at 85° C. under atmospheric pressure. For comparative purposes a series of cups were molded from an untreated composition, another series from the same molding composition to which 3 per cent by weight of water had been added, and a further series incorporating 5 per cent by weight of water.

With one molding composition made from wood flour and a phenol-formaldehyde resin, it was found that the cups molded at about 2000 pounds pressure per square inch and about 170° C. from the untreated composition began to show surface cracks on the average in about 24 to 48 hours. When 3 per cent of water was included in the same molding composition and under the same molding conditions, the cups molded therefrom withstood baking for 60 to 100 hours and longer before there were signs of surface cracks. A 5 per cent addition of water resulted in cups that were free of surface cracks after a period of 350 hours.

Another molding composition made from a mixture of wood flour and a phenol-formaldehyde resinoid and molded at a pressure of about 2000 pounds per square inch and a temperature of about 170° C. yielded cups from the untreated composition that under the moisture test cracked at the end of 139 hours, while cups from both the 3 per cent and the 5 per cent water compositions were in perfect condition at the end of 480 hours. These mixtures were also measured for loss in weight during the molding operation; the untreated composition showed losses from 0.54 to 0.68 per cent, the 3 per cent water composition showed losses of 0.45 to 0.60 per cent and the 5 per cent composition showed losses of from 1.02 to 1.40 per cent. Further tests were made on these mixtures by soaking pieces molded from them in cold water to determine the expansion. After 144 hours immersion pieces from the untreated composition had expanded an average of .004 inch per inch of length, those from the 3 per cent water composition .0017 inch per inch and those from the 5 per cent composition .0018 inch per inch of length. The surfaces of the first set of pieces, moreover were decidedly rough and pimply, while there were no signs of roughening or pimpling on the other sets molded from the water-containing compositions.

With regard to the foregoing tests it is to be noted that the use of elevated temperatures is for the purpose of securing accelerated results. Furthermore the results obtained are dependent on the relative humidity conditions maintained about the exterior of a cup when the interior is filled with water; a large difference in humidity about the exterior as compared with that of the interior also greatly accelerates the destruction of the cups. For example, the conditions may be such that a cup will withstand a test for only 24 hours; the same cup under room conditions of temperature and humidity when filled with water will last for several weeks or months. In the foregoing tests all the cups of any series were placed in the oven at the same time and the tests were accelerated by the use of well ventilated ovens.

While water is the preferred wetting agent because of its substantially non-solvent character and availability, other liquid non-solvents as benzol can be substituted in part if not entirely for water. Furthermore liquids regarded as plasticizers or as solvents for the resinoid in the potentially reactive condition, such as phenol, furfural, benzaldehyde, etc. can be included with water; in fact equal parts of water and phenol when tried gave results commensurate with that of water alone.

The technical applications made possible by this invention are of the utmost importance. For example agitators for washing machines, when molded by the application of heat and pressure as is usual in the molding art from an untreated composition, were found to crack and break down soon after being put into use; but when the same molding composition was treated with water as herein disclosed, the agitators made under the same molding conditions of applied heat and pressure had a satisfactory life in use. Again in soda fountain equipment articles molded from untreated compositions do not stand up under conditions of use, though phenol-formaldehyde resinoid compositions are much to be desired on account of their antiseptic nature, appearance, resistance to acids and other properties; articles made from compositions as treated herein, however, have shown the requisite resistance to function satisfactorily as spigots, counter tops, rings, syrup covers, etc. Another striking application of this invention is in connection with the molding of spinning buckets used in the manufacture of rayon. When molded from the normal molding compositions their life was short and they were lacking in strength; but with the addition of water to the molding composite before sending it to the molder and without any other change in the practice the buckets had surprising strength and greatly prolonged life. A further useful application of the invention is in the manufacture of jars for cold creams and cosmetics that have a large moisture content.

I claim:

1. Process of producing molded articles resistant to distortion by liquids from a moldable powdered composition of a potentially reactive phenol-aldehyde resin and a fibrous filler which comprises the addition of water to the composition but in an amount insufficient to materially alter its powdered condition, charging the composition into a mold, subjecting the composition while in the mold to the action of pressure to cause the composition to conform to the mold, and simultaneously applying heat to cause transformation of the resin to an infusible state in the mold.

2. Process of producing molded articles resistant to distortion by liquids from a moldable powdered composition of a potentially reactive resin and a fibrous filler which comprises the addition of a non-solvent wetting agent to the composition but in an amount insufficient to materially alter its powdered condition or prevent hardening of the composition, said wetting agent having a boiling point below the molding temperature, charging the composition into a mold, subjecting the composition while in the mold to the action of pressure to cause the composition to conform to the mold, and simultaneously applying heat to cause transformation of the resin to the infusible state in the mold.

3. Process of producing molded articles resistant to distortion by liquids from a moldable composition of a potentially reactive phenol-formaldehyde resin and a fibrous filler which comprises the addition of water to the composition in amount up to about 5 per cent by weight, charging the composition into a mold, subjecting the composition while in the mold to the action of pressure to cause the composition to conform to the mold, and simultaneously applying heat to cause transformation of the resin to the infusible state in the mold.

4. Process of producing molded articles resistant to distortion by liquids from a moldable composition of a potentially reactive resin and a fibrous filler which comprises the addition of a wetting agent to the composition in amount up to about 5 per cent by weight, charging the composition into a mold, subjecting the composition while in the mold to the action of pressure to cause the composition to conform to the mold, and simultaneously applying heat to cause transformation of the resin to the infusible state in the mold.

5. Process of preparing a molding composition suitable for hot-molding which comprises forming a powdered composition from a fibrous filler and a potentially reactive resin, and incorporating therewith a non-solvent wetting agent having a boiling point below the molding temperature and insufficient in amount to materially alter the powdered condition of the composition or prevent molding of the composition whereby articles molded under the combined action of heat and pressure are obtainable characterized by resistance to distortion from contacting liquids.

6. Process of preparing a molding composition suitable for hot-molding which comprises forming a powdered composition from a fibrous filler and a potentially reactive phenol-formaldehyde resin, and incorporating therewith water but insufficient in amount to materially alter the powdered condition of the composition whereby articles molded under the combined action of heat and pressure are obtainable characterized by resistance to distortion from contacting liquids.

7. Process of preparing a molding composition suitable for hot-molding which comprises forming a powdered composition from a fibrous filler and a potentially reactive resin, and incorporating therewith a wetting agent in amount up to 5 per cent by weight whereby articles molded under the combined action of heat and pressure are obtainable characterized by resistance to distortion from contacting liquids.

8. Process of preparing a molding composition suitable for hot-molding which comprises forming a powdered composition from a fibrous filler and a potentially reactive phenol-formaldehyde resin, and incorporating therewith water in amount up to 5 per cent by weight whereby articles molded under the combined action of heat and pressure are obtainable characterized by resistance to distortion from contacting liquids.

9. Article molded under the combined action of heat and pressure from a composition of a fibrous filler and a heat-hardening resin in the presence of an added non-solvent wetting agent insufficient in amount to prevent hardening and having a boiling point below the molding temperature, said article being characterized by resistance to distortion by contacting liquids.

10. Article molded under the combined action of heat and pressure from a composition of a fibrous filler and a heat-hardening resin in the presence of an added non-solvent wetting agent in amount not exceeding 5 per cent by weight of the composition and having a boiling point below the molding temperature, said article being characterized by resistance to distortion by contacting liquids.

11. Article molded under the combined action of heat and pressure from a composition of a fibrous filler and a heat-hardening resin in the presence of added water in amount not exceeding 5 per cent by weight of the composition and having a boiling point below the molding temperature, said article being characterized by resistance to distortion by contacting liquids.

CLARENCE A. NASH.